(12) United States Patent
Silberman et al.

(10) Patent No.: US 7,543,395 B2
(45) Date of Patent: Jun. 9, 2009

(54) TRUCK HEIGHT MEASUREMENT POLE

(76) Inventors: Scott A. Silberman, 1838 Doral Ct., Bloomfield Hills, MI (US) 48302; John E. Male, 5122 Lake Bluff Rd., West Bloomfield, MI (US) 48323

( * ) Notice: Subject to any disclaimer, the term of this patent is extended or adjusted under 35 U.S.C. 154(b) by 0 days.

(21) Appl. No.: 11/784,440

(22) Filed: Apr. 6, 2007

(65) Prior Publication Data
US 2008/0244921 A1 Oct. 9, 2008

(51) Int. Cl.
*G01B 3/22* (2006.01)
*G01C 15/00* (2006.01)

(52) U.S. Cl. ...................................................... 33/832

(58) Field of Classification Search .................. 33/832, 33/809–810, 293, 296, 512, 494
See application file for complete search history.

(56) References Cited

U.S. PATENT DOCUMENTS

| | | | | | |
|---|---|---|---|---|---|
| 1,985,527 | A * | 12/1934 | Taylor | .......................... | 33/512 |
| 3,147,829 | A * | 9/1964 | Johnson et al. | ............... | 52/115 |
| 3,298,328 | A * | 1/1967 | Hoodis | ........................ | 108/129 |
| 3,492,729 | A * | 2/1970 | Crain | .......................... | 33/296 |
| 3,492,737 | A * | 2/1970 | Swanson | ..................... | 33/809 |
| 3,624,855 | A * | 12/1971 | Shaw | ............................. | 15/98 |
| 3,642,245 | A * | 2/1972 | Wohnlich | ................... | 248/478 |
| 3,760,441 | A * | 9/1973 | Handelman | ................. | 116/107 |
| 3,808,690 | A * | 5/1974 | Balder | ........................ | 33/1 CC |
| 3,980,276 | A * | 9/1976 | Burkland | .................... | 254/415 |
| 4,196,521 | A * | 4/1980 | Hutchinson et al. | ........... | 33/512 |
| 4,202,108 | A * | 5/1980 | Adams et al. | ................. | 33/379 |
| 4,621,431 | A * | 11/1986 | Fatool et al. | ................... | 33/809 |
| 4,762,200 | A * | 8/1988 | Andrews et al. | ............ | 182/151 |
| 4,877,164 | A * | 10/1989 | Baucom | ...................... | 224/544 |
| 4,899,452 | A * | 2/1990 | Schafer | ........................ | 33/296 |
| 5,076,002 | A * | 12/1991 | Kelly | .......................... | 43/17.2 |
| 5,317,813 | A * | 6/1994 | Reed | ............................. | 33/809 |
| 5,357,683 | A * | 10/1994 | Trevino | ........................ | 33/528 |
| 5,566,460 | A * | 10/1996 | Bates | .......................... | 33/296 |
| 6,003,235 | A * | 12/1999 | Chen | ........................... | 33/512 |
| 6,076,267 | A * | 6/2000 | Gotoh | ......................... | 33/293 |
| 6,085,434 | A * | 7/2000 | Mitchell | ...................... | 33/809 |
| 6,128,824 | A * | 10/2000 | Yang | ........................... | 33/511 |
| 6,226,881 | B1 * | 5/2001 | Landauer | ..................... | 33/515 |
| 6,341,614 | B1 * | 1/2002 | Tucker et al. | .................. | 135/75 |
| 6,769,192 | B2 * | 8/2004 | Johansson et al. | ............. | 33/608 |
| 6,820,342 | B2 * | 11/2004 | Ramsthaler | ................. | 33/41.4 |
| 6,938,927 | B1 * | 9/2005 | Martin et al. | ............... | 280/819 |
| 7,121,038 | B1 * | 10/2006 | Smith | .......................... | 43/17.5 |
| 7,200,952 | B2 * | 4/2007 | Montagnino | ................. | 33/832 |
| 7,204,031 | B2 * | 4/2007 | Hanson | ........................ | 33/479 |
| 7,275,335 | B2 * | 10/2007 | Holec et al. | ................... | 33/784 |
| 2002/0082102 | A1 * | 6/2002 | Reilly | ......................... | 473/219 |
| 2004/0259698 | A1 * | 12/2004 | Reilly | ......................... | 482/109 |

* cited by examiner

*Primary Examiner*—Yaritza Guadalupe-McCall
(74) *Attorney, Agent, or Firm*—Young Basile

(57) ABSTRACT

An extendable truck height measuring pole comprising a tubular body, one or more telescopic extension members slideably deployable from a stowed position in the telescopic body, a contact member on the distal end of the top most extension member and connected to the extension member by means of a pull-to-release joint. By operating the joint, the contact member may be deployed to a position at right angles with the longitudinal axis of the pole. Alternatively, the contact leg may be moved to a stowed position adjacent and parallel to the pole. Truck height is read from indicia on the extension member or members.

2 Claims, 5 Drawing Sheets

TRUCK HEIGHT MEASUREMENT POLE

FIELD OF THE INVENTION

This invention relates to collapsible pole-like devices for measuring the height of trucks and/or cargo therein to ascertain whether or not they may fit under bridges, overpasses and the like, and more particularly to a spring-loaded joint which facilitates the operation of such devices.

BACKGROUND OF THE INVENTION

It is important to measure the height of loaded and unloaded trucks to determine whether they will fit without interference under bridges, overpasses, traffic lights and other potential obstacles along a route of travel. While this can be done with complicated electric eyes, radar devices and the like at major trucking terminals, it is often necessary to make at least rough height measurements in the field and the present invention provides a simple and economical tool for performing this function.

SUMMARY OF THE INVENTION

The invention provides a collapsible pole for measuring the height of trucks, either loaded or unloaded. Generally described, the invention comprises a tubular body and at least one extension member telescopically mounted within the tubular body so that it may be extended therefrom to any desired extent. The extension member or members preferably have height indicia thereon. The overall length of the device is minimum when the extension member or members are fully telescopically retracted and is greatest when the extension member or member are fully telescopically extended. A contact leg is pivotally mounted on the distal end of the extension member by means of a simple pull-to-release detent joint which allows the contact leg to be easily and simply deployed or stowed. The deployed position is at right angles to the body and the stowed position is parallel to the body. Additional positions can also be provided between the two described, if desired.

In an illustrative form, the pull-to-release joint comprises two complemental and coaxial components, one having a plurality of angularly spaced detent grooves formed therein and the other having a plurality of angularly spaced dogs formed thereon which fit complementally into the detent grooves when aligned therewith. The joint further comprises a spring that urges the two components together; i.e., into a locked condition, but permits them to be pulled apart by manual force to either deploy or fold the measuring leg relative to the tubular body. Two different embodiments of the joint are disclosed herein.

DETAILED DESCRIPTION OF AN ILLUSTRATIVE EMBODIMENT

Figure 1:
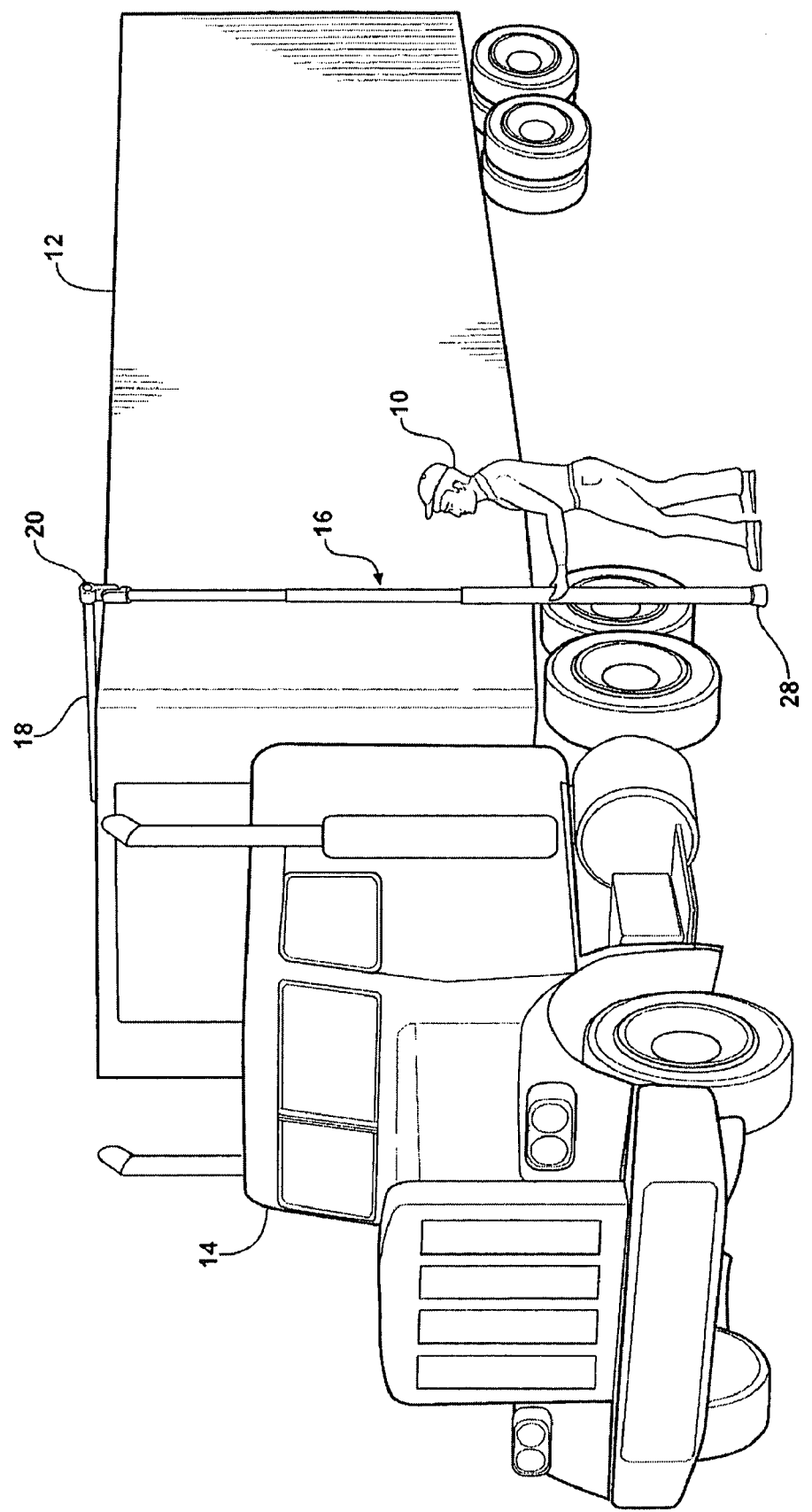
FIG. 1 is a perspective view of a person measuring the height of a tractor/trailer using an embodiment of the invention.

FIG. 1 shows an operator 10 measuring the height of a trailer 12 attached to a conventional diesel powered tractor 14. The operator 10 is making the measurement with a vertically oriented telescopic pole 16 having a horizontal contact leg 18 connected to the top or distal end thereof by means of a pull-to-release joint 20. With the bottom pad 28 of the pole 16 resting on the ground beside the tractor-trailer combination 14, 12 and the contact leg 18 touching or just clearing the top of the trailer 12, the height can be read from the pole 16 as hereinafter described.

Figure 5:
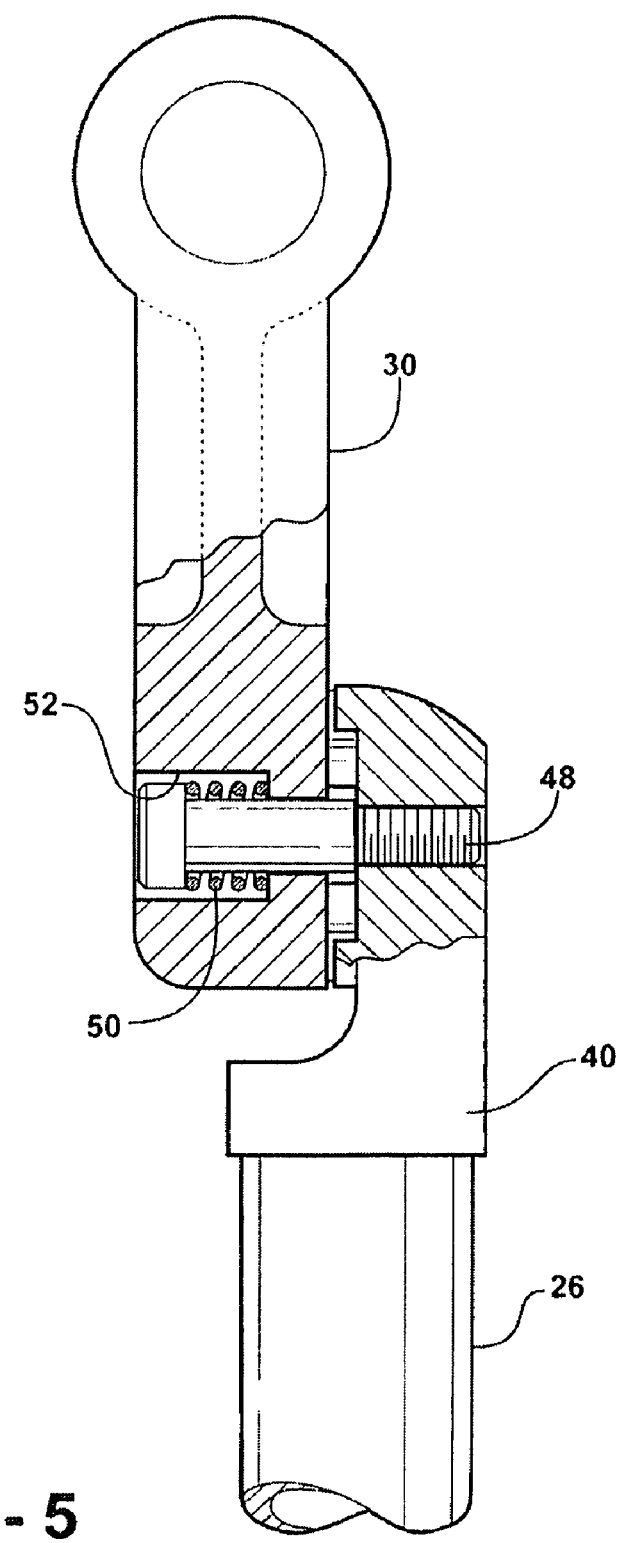
FIG. 5 is an assembled sectional view of the pull-to-release joint of FIG. 4.
Figure 6:
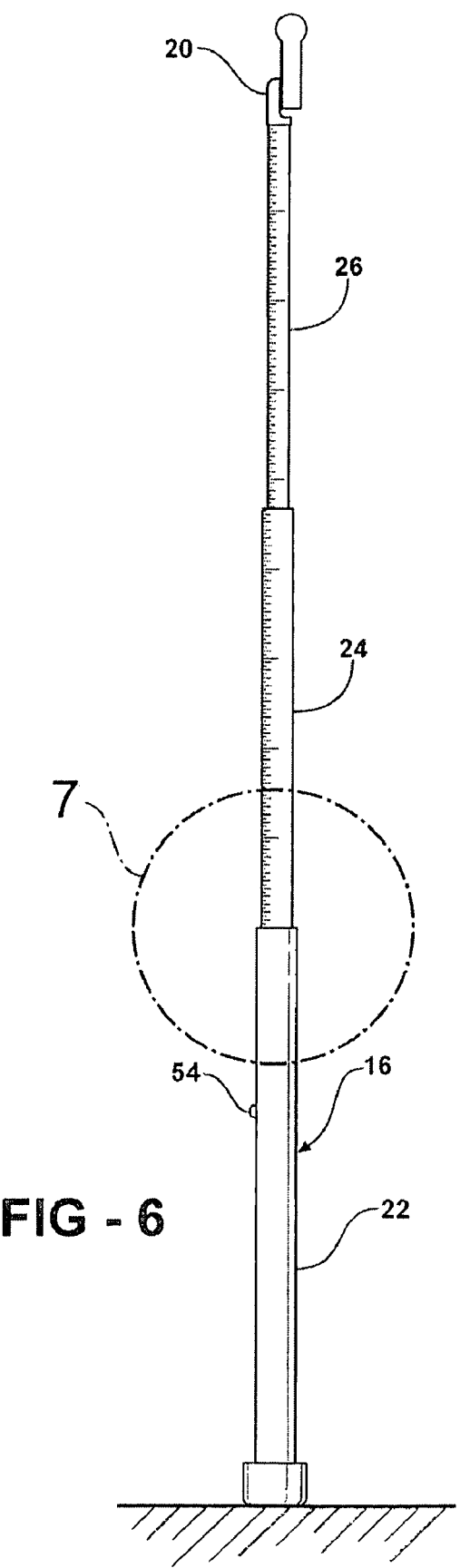
FIG. 6 is a side view of a fully extended embodiment of the invention showing the location of indicia of an extension member.
Figure 7:
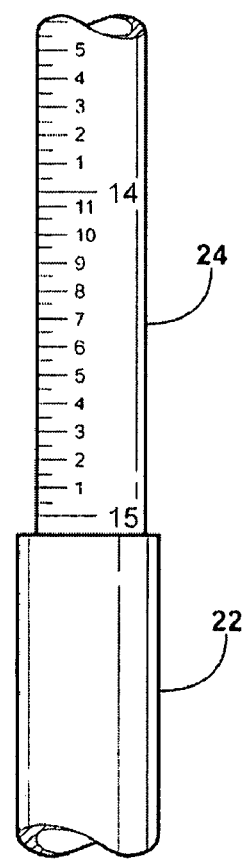
FIG. 7 is a close up of the circled portion of FIG. 6.

Looking now to FIGS. 2-7, the pole 16 is shown to comprise a tubular body 22 and coaxial telescopic extension members 24 and 26 slideable therefrom. The extension members 24, 26 carry indicia as best shown in FIG. 7. The indicia is progressive; i.e., markings along extension member 26 are graded with the assumption that extension member 24 is fully telescopically retracted into the body 22. It is also necessary to know the length of the body 22 when marking the extension member 26. If the indicia on the extension member 24 assumes a full extension of the extension member 26 and, as shown in FIG. 7, includes measurements in both feet and inches. Other scales, such as metric, can also be used.

Figure 4:
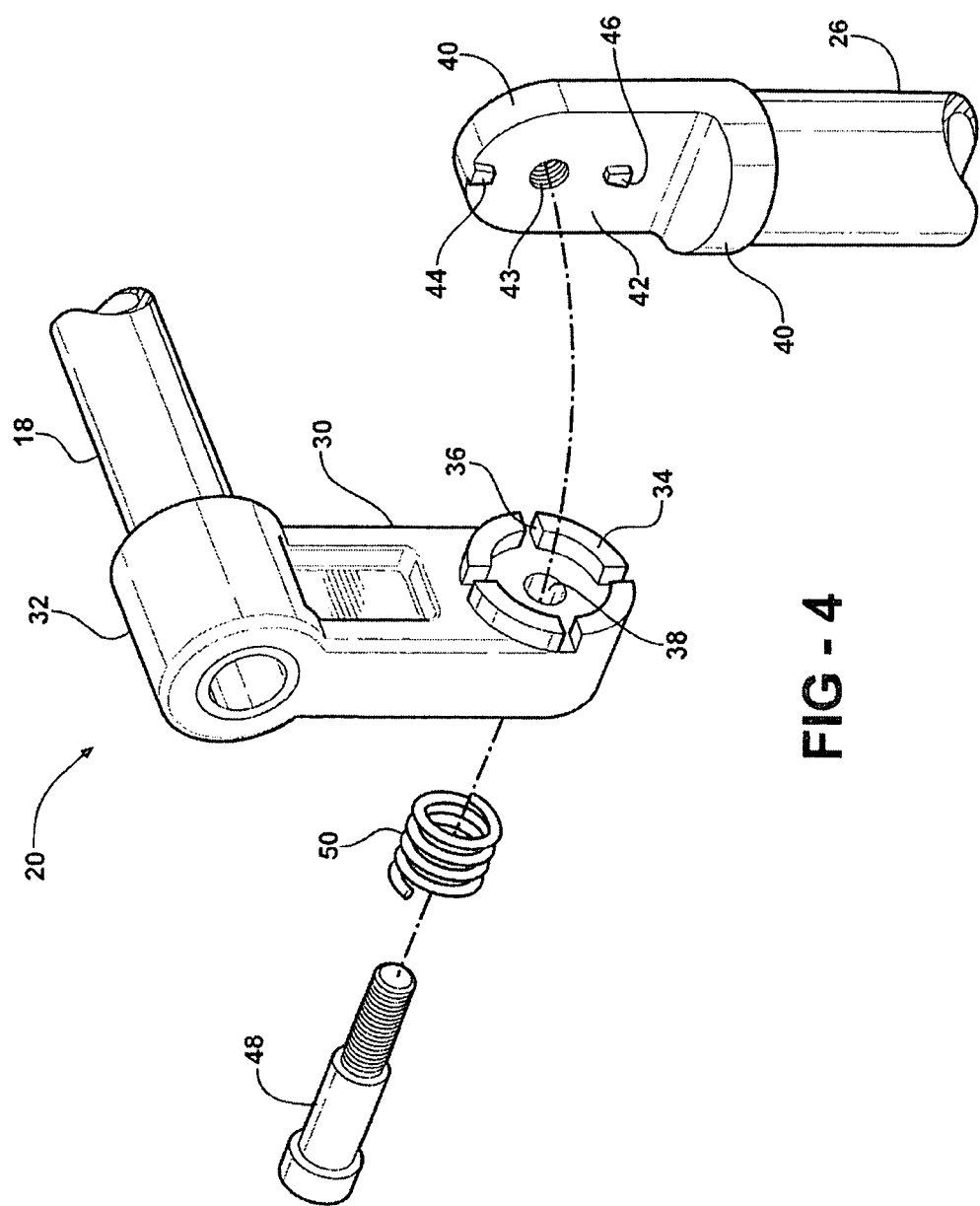
FIG. 4 is an exploded perspective drawing of a pull-to-release joint used in the embodiment of the invention shown in FIGS. 1-3.

The pull-to-release joint 20 is best shown in FIGS. 4 and 5 to comprise a first cast metal component 30 having a hollow cylindrical portion 32 adapted to receive therein an end of the measurement of the tubular measurement leg 18. The component 30 also comprises a locking portion having coaxial segments 34 interrupted by gaps 36 to form grooves at 90 degree intervals around a central bore 38.

The joint 20 further comprises a complemental metal casting 40 having a socket portion 41 which receives the upper or distal end of the extension member 26. Component 40 further comprises a threaded bore 43 and a pair of diametrically opposed dogs 44 and 46. The complemental component 40 is brought adjacent the complemental component 30 such that the bores 38 and 43 are in alignment and the dogs 44 and 46 rest in a pair of diametrically opposed notches or recesses 36 between the segments 34. A threaded bolt 48 is inserted through the bore 38 and threaded into the bore 43 with a spring 50 trapped between the head of the bore and the bottom of the countersunk hole 52 best shown in FIG. 5. Spring 50, therefore, urges the complemental components 30, 40 together but yields to manual force tending to separate the two components along the axis of the bolt 48 to pull the dogs 44, 46 out of the recesses 36 and permit angular rotation of the component 30 relative to the component 40.

Figures 2, 3:
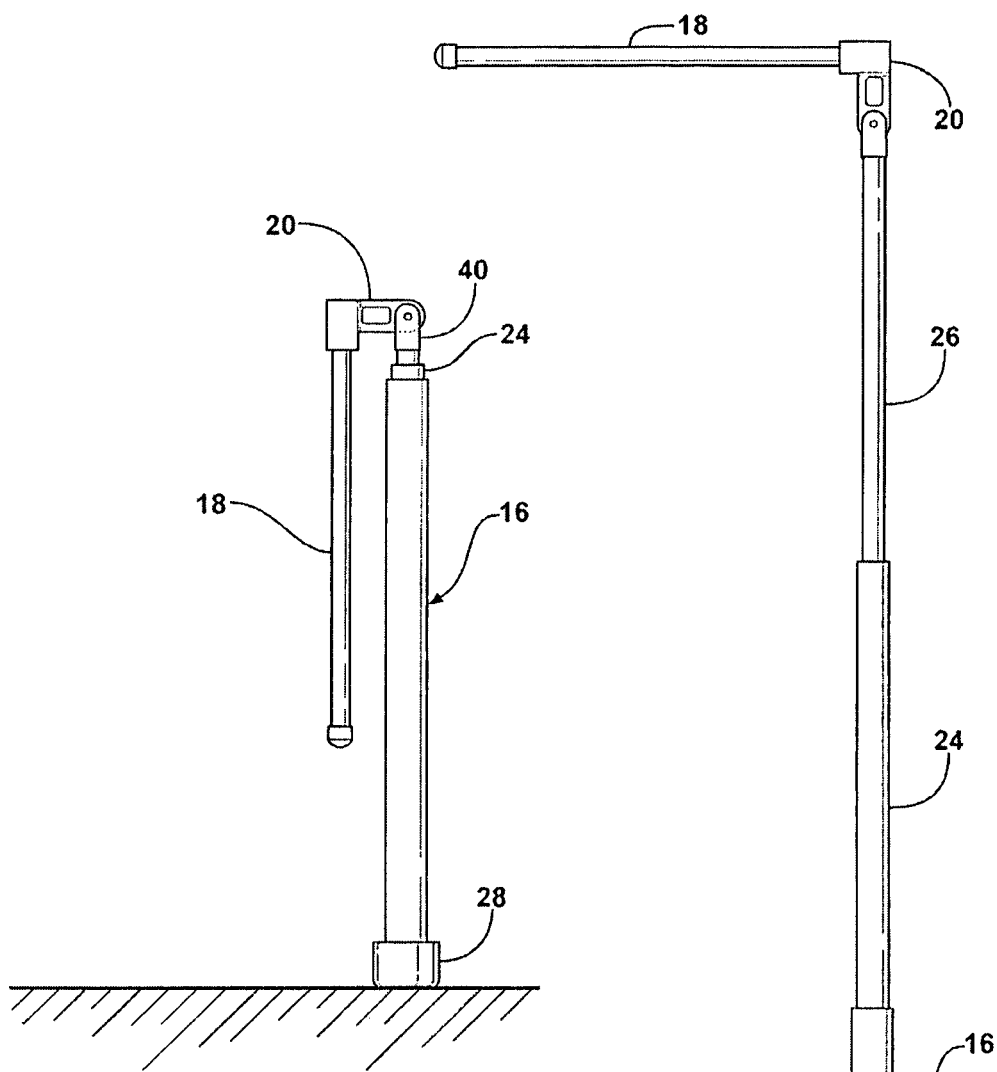
FIG. 2 is a side view of an embodiment of the invention in a fully collapsed condition.
FIG. 3 is a side view of an embodiment of the invention in the fully telescopically extended condition.

By reason of the construction described immediately above, the joint 20 may be quickly and easily manipulated to place the contact leg 18 at right angles to the pole 16 as shown in FIGS. 1, 2 and 3 for measurement purposes. Alternatively, it may be adjusted back to a stowed position wherein the leg 18 is adjacent but parallel to the body 22. With additional recesses 36, other locking positions can also be provided for, if desired.

Although the operation of the device 16 is believed to be apparent from the foregoing, a brief description will be given. To measure the height of the top of the trailer 12 the operator 10 fully extends the smaller or top most of the two extension members 26, 24, places the device 16 on the ground next to the trailer 12 and either sets the weight of the stick to the minimum bridge height along the proposed route and swings the cross-arm over the load as a go-no-go gauge, or, if bridge heights are not known, uses the stick to measure the height of the load so the driver can make bridge height determinations while on the road. Standing next to the truck, the operator continues to extend the lower most extension member 24 until the contact member 18 clears the top of the truck when swung over the trailer 12 as shown in FIG. 1. The height in feet and inches (or other appropriate scale) is read from the indicia as shown in FIG. 7. The device may then be reconfigured to the stowed configuration by fully retracting both of the extension members and manipulating the joint 20 to bring the contact leg 18 into parallel relationship with the tubular body 22. Reconfigured the device 16 from the stowed condition to the deployed condition is simple and easy by virtue of the pull-to-release characteristics of the joint 20. The device 16 may be made in such a way as to be light and easy to carry. Obviously, there must be some friction between the body 22 and the extension members 24 and 26 to cause them to hold their position when deployed as shown in FIGS. 1 and 3. If desired, twist-to-lock mechanisms such as those used conventionally in boat hooks and the like may also be employed to hold the extension members 24, 26 firmly in position. Alternatively, a simple ball-type detent 54 may also be used as shown in FIG. 6. While the invention has been described with reference to an illustrative embodiment, it is to be understood that various modifications and substitutions to components and design aspects of the embodiment can be made. Further, components described as cast or otherwise formed metal may alternatively be made of plastic.

What is claimed is:

1. A collapsible device for measuring the height of a road vehicle such as a truck or trailer comprising:
   an elongate tubular pole having a foot adapted to rest on the ground in use;
   at least one elongate extension member telescopically and slidably disposed within the pole for selective extension relative thereto and having measurement indicia thereon;
   a joint mounting member fixedly attached to the distal end of the extension member and defining a pivot axis at right angles to the pole;
   a contact leg adapted to be placed on top of the vehicle to be measured;
   a joint having hollow cylindrical portion and a short leg portion integral therewith and extending at a right angle therefrom, the contact leg being fixedly mounted in said cylindrical portion; and
   a pull-to-release, spring-biased detent mechanism connecting the short joint leg portion to the joint mounting member about said pivot axis for releasably locking the contact leg in each of a stowed position wherein the contact leg is folded into a position which is adjacent to but spaced from and parallel to the extension member, and a deployed position wherein the contact leg is at right angles to the extension member and the short leg portion is at right angles to the pole.

2. A collapsible device for measuring the height of a road vehicle as defined in claim 1 wherein:
   the detent mechanism comprises a single locking face on the short leg portion having arcuate lugs arranged around said pivot axis with gaps therebetween; and
   an abutting face on the joint mounting member with a dog which coacts with and fits between the arcuate lugs; and
   a coaxial spring which urges the dog into the gaps between the arcuate lugs.

* * * * *